United States Patent
Kozawa et al.

(10) Patent No.: US 11,118,047 B2
(45) Date of Patent: Sep. 14, 2021

(54) COMPOSITION FOR A GLASS FIBER-REINFORCED POLYOLEFIN RESIN MATERIAL, GLASS FIBER-REINFORCED POLYOLEFIN RESIN MATERIAL AND ITS PRODUCTION METHOD, AND COMPOSITE

(71) Applicant: FURUKAWA ELECTRIC CO., LTD., Tokyo (JP)

(72) Inventors: Eiji Kozawa, Tokyo (JP); Sinji Satoh, Tokyo (JP); Keiko Chikazawa; Yasuo Nakajima, Tokyo (JP); Takeshi Yagi, Tokyo (JP); Koichi Maeno, Tokyo (JP); Satoshi Takamura, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/415,674

(22) Filed: May 17, 2019

(65) Prior Publication Data
US 2019/0292360 A1  Sep. 26, 2019

Related U.S. Application Data

(63) Continuation of application No. PCT/JP2017/041902, filed on Nov. 21, 2017.

(30) Foreign Application Priority Data

Nov. 21, 2016 (JP) ............................. JP2016-226339

(51) Int. Cl.
| | | |
|---|---|---|
| *C08L 51/06* | (2006.01) | |
| *C08K 7/14* | (2006.01) | |
| *C08L 23/26* | (2006.01) | |
| *C09J 11/04* | (2006.01) | |
| *C09J 151/06* | (2006.01) | |
| *C08L 33/06* | (2006.01) | |
| *C08L 33/12* | (2006.01) | |

(52) U.S. Cl.
CPC ............ *C08L 51/06* (2013.01); *C08K 7/14* (2013.01); *C08L 23/26* (2013.01); *C09J 11/04* (2013.01); *C09J 151/06* (2013.01); *C08L 33/068* (2013.01); *C08L 33/12* (2013.01); *C08L 2205/16* (2013.01)

(58) Field of Classification Search
CPC .... C08L 51/06; C08L 33/068; C08L 2205/16; C08L 23/26; C08K 7/14
USPC ....................................................... 524/494
See application file for complete search history.

(56) References Cited

U.S. PATENT DOCUMENTS

| | | | |
|---|---|---|---|
| 4,621,115 A | 11/1986 | Morita et al. | |
| 5,514,745 A | 5/1996 | Yoshino | |
| 2012/0295504 A1 | 11/2012 | Miyauchi et al. | |
| 2016/0243794 A1* | 8/2016 | Hirano | B32B 7/12 |

FOREIGN PATENT DOCUMENTS

| | | | |
|---|---|---|---|
| CN | 105131496 A | * | 12/2015 |
| JP | 62-243633 A | | 10/1987 |
| JP | 62243633 A | * | 10/1987 |
| JP | 3-181528 A | | 8/1991 |
| JP | 6-322268 A | | 11/1994 |
| JP | 06322268 A | * | 11/1994 |
| JP | 7-232324 A | | 9/1995 |
| JP | 10-176085 A | | 6/1998 |
| JP | 2004-231911 A | | 8/2004 |
| JP | 2005-290110 A | | 10/2005 |
| JP | 2015-143370 A | | 8/2015 |
| JP | 2016-108521 A | | 6/2016 |

OTHER PUBLICATIONS

Translation of CN 105131496, Dec. 9, 2015. (Year: 2015).*
Abstract of JP 62243633, Oct. 24, 1987. (Year: 1987).*
Translation of JP 06322268, Nov. 22, 1994. (Year: 1994).*
International Search Report, issued in PCT/JP2017/041902, PCT/ISA/210, dated Feb. 20, 2018.
Written Opinion of the International Searching Authority, issued in PCT/JP2017/041902, PCT/ISA/237, dated Feb. 20, 2018.
Extended European Search Report, dated Jun. 24, 2020, for European Application No. 17870956.4.
Japanese Office Action for Japanese Application No. 2018-551725, dated May 11, 2021, with English translation.

* cited by examiner

*Primary Examiner* — Hui H Chin
(74) *Attorney, Agent, or Firm* — Birch, Stewart, Kolasch & Birch, LLP

(57) ABSTRACT

A glass fiber-reinforced polyolefin resin material, containing: a glass fiber; and a thermoplastic resin, wherein said thermoplastic resin contains: at least, a specific graft-modified polypropylene, wherein, with respect to the graft-modified polypropylene, each specific amounts of the glass fiber and a compound or polymer having an acid anhydride structure are contained, and wherein, in the content of a graft-modification component in the graft-modified polypropylene, the content of a component obtained from the (meth)acrylate containing an epoxy group is 0.5 or more and 10 or less parts by mass with respect to 100 parts by mass of said polypropylene, and a component obtained from the aromatic vinyl compound has a mass equal to or less than said component obtained from the (meth)acrylate; a composition for said resin material; a method of producing the same; and a composite.

9 Claims, No Drawings

COMPOSITION FOR A GLASS FIBER-REINFORCED POLYOLEFIN RESIN MATERIAL, GLASS FIBER-REINFORCED POLYOLEFIN RESIN MATERIAL AND ITS PRODUCTION METHOD, AND COMPOSITE

CROSS-REFERENCE TO RELATED APPLICATIONS

This application is a Continuation of PCT International Application No. PCT/JP2017/041902 filed on Nov. 21, 2017, which claims priority under 35 U.S.C. § 119 (a) to Japanese Patent Application No. 2016-226339 filed in Japan on Nov. 21, 2016. Each of the above applications is hereby expressly incorporated by reference, in its entirety, into the present application.

TECHNICAL FIELD

The present invention relates to a composition for a glass fiber-reinforced polyolefin resin material, a glass fiber-reinforced polyolefin resin material and its production method, and a composite.

BACKGROUND ART

For structural materials, such as an air craft and a vehicle, or sporting goods, and the like, use is made of an adhesive or an adhesive resin material, each of which adheres to a metal. The adhesive or the adhesive resin material is utilized, as adhesives for coating a metal surface with a resin, or for producing a laminate material composed of a metal and a resin, or further for adhering metals to one another or a metal and another material to one another.

In a case of the use for the above-described structural materials, such as an air craft and a vehicle, or sporting goods, and the like, a mechanical strength is required.

Among the thermoplastic resins, the polypropylene that has a good physical property balance, such as heat resistance, intensity resistance, and impact resistance, is a commonly used resin. However, the polypropylene has no adhesion to other materials, so that in order to adhere to a metal or the like in particular, it is necessary to roughen the surface of the metal, or to provide newly an adhesive layer, or to perform a physical or chemical pretreatment, such as a corona processing, a baking processing, a primer processing, and the like, of the adherend surface. Worse still, even though such a pretreatment is performed, adhesion strength is weak.

On the other hand, in order to enhance mechanical strength, known is a reinforced resin, incorporating in a resin, a reinforcement material, for example, an inorganic fiber, such as glass fiber, carbon fiber, metal fiber, and ceramic fiber, and a synthetic or natural organic fiber, such as polyester fiber, polyolefin fiber, and cellulose fiber.

Examples of the reinforced resin employing polypropylene include a glass fiber-reinforced resin described in Patent Literature 1 and a carbon fiber-reinforced resin described in Patent Literature 2.

CITATION LIST

Patent Literatures

Patent Literature 1: JP-A-1998 (H10)-176085
Patent Literature 2: JP-A-2015-143370

SUMMARY OF INVENTION

Technical Problem

However, the glass fiber-reinforced resin described in Patent Literature 1 has no adhesion to a metal, unless physically or chemically pretreated as described above, and worse still, even if such a pretreatment is performed, adhesion strength is weak.

On the other hand, although the carbon fiber-reinforced resin described in Patent Literature 2 shows adhesion to a metal, there is a need for a formulation that further enhance mechanical strength, such as tensile strength. In view of that, for the carbon fiber-reinforced composite material described in Patent Literature 2, this problem has been solved by adopting a method of alternately laminating a modified-propylene film and a carbon fiber-plain weave material. However, since there are many steps to produce, this method has less productivity.

Accordingly, the present invention is contemplated for providing: a glass fiber-reinforced polyolefin resin material that shows an excellent balance between mechanical strength and adhesion to a metal; a glass fiber-reinforced polyolefin resin material composition for producing said resin material; and a composite of the glass fiber-reinforced polyolefin resin material.

Further, the present invention is contemplated for providing: a method of producing a glass fiber-reinforced polyolefin resin material that also balances a good productivity with physical properties represented by mechanical strength and adhesion to a metal, whereby the glass fiber-reinforced polyolefin resin material can be produced easily and inexpensively.

Solution to Problem

As a result of repeated intensive research, in the combination of a glass fiber of the reinforcement fiber and polypropylene that has an excellent physical property balance, such as heat resistance, intensity resistance, and impact resistance, the inventors of the present invention have found that mechanical strength was further enhanced with excellent adhesion, by altering the polypropylene to a graft-modified polypropylene modified with a (meth)acrylate containing an epoxy group, and also by combining said graft-modified polypropylene and a compound or polymer having an acid anhydride structure.

As a result of further studies based on the above findings, it has been found that the above problems are solved by the following constitutions.

(1) A glass fiber-reinforced polyolefin resin material, comprising: a glass fiber; and a thermoplastic resin, wherein said thermoplastic resin comprises: at least, a graft-modified polypropylene modified with a (meth)acrylate containing an epoxy group or a graft-modified polypropylene modified with both a (meth)acrylate containing an epoxy group and an aromatic vinyl compound, wherein, with respect to 100 parts by mass of the graft-modified polypropylene, from 30 to 80 parts by mass of the glass fiber and from 1 to 20 parts by mass of a compound or polymer having an acid anhydride structure are contained, and wherein, in the content of a graft-modification component in the graft-modified polypropylene, the content of a component obtained from the (meth)acrylate containing an epoxy group is 0.5 or more and 10 or less parts by mass with respect to 100 parts by mass of said polypropylene, and a component obtained from the aromatic vinyl compound has a mass equal to or less than said component obtained from the (meth)acrylate.

(2) The glass fiber-reinforced polyolefin resin material as described in the item (1), wherein, with respect to a 2 mm-thick sheet formed by adhering the glass fiber-reinforced polyolefin resin material to an aluminum sheet, the peel strength by a 180° peel test after leaving, for 5 minutes at 220° C., the 2 mm-thick sheet in the condition of being placed in contact with a 0.1 mm-thick aluminum sheet having the same area, while applying a pressure thereto, is 1.6 N/mm or more.

(3) The glass fiber-reinforced polyolefin resin material as described in the item (1) or (2), wherein the tensile strength in conformity to JIS K 7161 of the sheet formed from the glass fiber-reinforced polyolefin resin material is 80 MPa or more.

(4) The glass fiber-reinforced polyolefin resin material as described in any one of the items (1) to (3), wherein a reinforcement fiber to be contained is only the glass fiber.

(5) The glass fiber-reinforced polyolefin resin material as described in any one of the items (1) to (4), wherein the diameter of the glass fiber is 20 μm or less and the length thereof is 1.2 mm or less.

(6) The glass fiber-reinforced polyolefin resin material as described in any one of the items (1) to (5), wherein the (meth)acrylate containing an epoxy group is glycidyl acrylate or glycidyl methacrylate.

(7) The glass fiber-reinforced polyolefin resin material as described in any one of the items (1) to (6), wherein the aromatic vinyl compound is a styrene compound whose benzene ring may have a substituent.

(8) The glass fiber-reinforced polyolefin resin material as described in any one of the items (1) to (7), wherein the compound or polymer having an acid anhydride structure is an acid anhydride-modified polypropylene.

(9) The glass fiber-reinforced polyolefin resin material as described in any one of the items (1) to (8), wherein the glass fiber-reinforced polyolefin resin material is a metal adhesive glass fiber-reinforced polyolefin resin material.

(10) A composition for a glass fiber-reinforced polyolefin resin material, which comprises: a thermoplastic resin containing at least a polypropylene; and with respect to 100 parts by mass of said polypropylene, from 30 to 80 parts by mass of glass fiber, from 1 to 20 parts by mass of a compound or polymer having an acid anhydride structure, from 0.1 to 0.6 parts by mass of an organic peroxide having a 1-minute half-life temperature of 130° C. or more and 175.2° C. or less, from 0.5 to 10 parts by mass of a (meth)acrylate containing an epoxy group, and an aromatic vinyl compound in a mass equal to or less than said (meth)acrylate.

(11) The composition for a glass fiber-reinforced polyolefin resin material as described in the item (10), wherein, with respect to a 2 mm-thick sheet formed by adhering the glass fiber-reinforced polyolefin resin material obtained by subjecting the composition for a glass fiber-reinforced polyolefin resin material to a graft reaction, to an aluminum sheet, the peel strength by a 180° peel test after leaving, for 5 minutes at 220° C., the 2 mm-thick sheet in the condition of being placed in contact with a 0.1 mm-thick aluminum sheet having the same area, while applying a pressure thereto, is 1.6 N/mm or more.

(12) The composition for a glass fiber-reinforced polyolefin resin material as described in the item (10) or (11), wherein the tensile strength in conformity to JIS K 7161 of the sheet formed from the glass fiber-reinforced polyolefin resin material obtained by subjecting the composition for a glass fiber-reinforced polyolefin resin material to a graft reaction, is 80 MPa or more.

(13) The composition for a glass fiber-reinforced polyolefin resin material as described in any one of the items (10) to (12), wherein a reinforcement fiber to be contained is only the glass fiber.

(14) The composition for a glass fiber-reinforced polyolefin resin material as described in any one of the items (10) to (13), wherein the diameter of the glass fiber is 20 μm or less and the length thereof is 1.2 mm or less.

(15) The composition for a glass fiber-reinforced polyolefin resin material as described in any one of the items (10) to (14), wherein the (meth)acrylate containing an epoxy group is glycidyl acrylate or glycidyl methacrylate.

(16) The composition for a glass fiber-reinforced polyolefin resin material as described in any one of the items (10) to (15), wherein the aromatic vinyl compound is a styrene compound whose benzene ring may have a substituent.

(17) The composition for a glass fiber-reinforced polyolefin resin material as described in any one of the items (10) to (16), wherein the compound or polymer having an acid anhydride structure is an acid anhydride-modified polypropylene.

(18) The composition for a glass fiber-reinforced polyolefin resin material as described in any one of the items (10) to (17), wherein the composition for a glass fiber-reinforced polyolefin resin material is a composition for a metal adhesive glass fiber-reinforced polyolefin resin material.

(19) A method of producing a glass fiber-reinforced polyolefin resin material, which comprises: subjecting the composition for a glass fiber-reinforced polyolefin resin material as described in any one of the items (10) to (18) to a graft reaction.

(20) The method of producing a glass fiber-reinforced polyolefin resin material as described in the item (19), which comprises: subjecting the composition for a glass fiber-reinforced polyolefin resin material to a graft reaction, with heat kneading in a twin-screw extruder.

(21) A composite, composed of: a metal; and the glass fiber-reinforced polyolefin resin material as described in any one of the items (1) to (9).

In the present invention and the present specification, the glass fiber-reinforced polyolefin resin material means a polyolefin resin material reinforced with a glass fiber. The polyolefin resin material means a formed article or a material for producing the formed article. The shape thereof may be a primary material, such as a pellet, and the shape is not limited in particular.

Further, the composition for a glass fiber-reinforced polyolefin resin material means is a composition for producing a glass fiber-reinforced polyolefin resin material. The production includes the following cases: all of the raw materials that constitute the composition may be contained in the composition from the beginning, or alternatively, in the middle of the progress of the graft reaction at the same time, the raw materials that constitute the composition may be added thereto in sequence by time difference.

Further, the expression "(meth)" as in (meth)acrylate is used as a collective term of the broader concept that means, for example, in a case of (meth)acrylate, either one of acrylate and methacrylate, or even a mixture thereof.

Effects of Invention

The present invention has allowed provision of a glass fiber-reinforced polyolefin resin material that has excellent mechanical strength and adhesion to a metal; and a composition for the glass fiber-reinforced polyolefin resin material that is for producing said resin material; and also a composite, composed of: the glass fiber-reinforced polyolefin resin material.

Further, according to the present invention, the glass fiber-reinforced polyolefin resin material can be produced only, by subjecting the above-described composition for the glass fiber-reinforced polyolefin resin material to a graft reaction, with heat kneading in a twin-screw extruder, so that the glass fiber-reinforced polyolefin resin material can be produced easily and inexpensively with high productivity.

MODE FOR CARRYING OUT THE INVENTION

A glass fiber-reinforced polyolefin resin material of the present invention contains a glass fiber and a thermoplastic resin. Said thermoplastic resin contains at least a graft-modified polypropylene modified with a (meth)acrylate containing an epoxy group or a graft-modified polypropylene modified with both a (meth)acrylate containing an epoxy group and an aromatic vinyl compound.

Further, with respect to 100 parts by mass of the graft-modified polypropylene, the content of the glass fiber is from 30 to 80 parts by mass and from 1 to 20 parts by mass of a compound or polymer having an acid anhydride structure is contained.

Further, for the graft-modified polypropylene, as the content of a graft-modification component, a component obtained from the (meth)acrylate containing an epoxy group is from 0.5 to 10 parts by mass with respect to 100 parts by mass of said polypropylene and a component obtained from the aromatic vinyl compound has a mass equal to or less than said component obtained from the (meth)acrylate.

Hereinafter, explanation will start in order from the glass fiber-reinforced polyolefin resin material.

<<Glass Fiber-Reinforced Polyolefin Resin Material>>

The polyolefin resin material of the present invention is glass fiber-reinforced. As a thermoplastic resin, a base resin and other resins are contained. As the base resin, at least a graft-modified polypropylene modified with a (meth)acrylate containing an epoxy group is contained. Meanwhile, the thermoplastic resin may be only the base resin.

<Base Resin>

The polyolefin resin material of the present invention contains a polypropylene having an epoxy group at a side chain as a base resin.

Herein, the base resin is a resin with the highest content among resin components which constitute the polyolefin resin material, and gives mechanical strength to the material. Further, in the present invention, the base resin gives adhesion to the material.

In the present invention, the polypropylene having an epoxy group at a side chain is a graft-modified polypropylene modified with a (meth)acrylate containing an epoxy group or a graft-modified polypropylene modified with both a (meth)acrylate containing an epoxy group and an aromatic vinyl compound.

In the present invention, those having (a1) a repeating unit represented by the following Formula (1) or (a2) a combination of a repeating unit structure represented by the following Formula (1) and a repeating unit structure represented by the following Formula (2), at a methyl group of the main chain or the side chain of the polypropylene, or those having (a3) a repeating unit represented by the following Formula (1) at either carbon atom of the methyl group of the main chain or the side chain of the polypropylene and a repeating unit represented by the following Formula (2) at the another carbon atom, or those having (a4) a mixed graft chain selected from any of the above-described (a1)~(a3), are preferred.

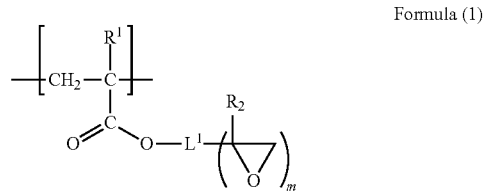
Formula (1)

Formula (2)

In the formulae, $R^1$ represents a hydrogen atom or a methyl group; $R^2$ represents a hydrogen atom or an alkyl group; $L^1$ represents a (m+1) valent linking group. m is an integer of 1 or more. $R^{11}$ and $R^{12}$ each independently represent a hydrogen atom, an alkyl group or a halogen atom; and $Ar^{11}$ represents an aryl group.

The carbon number of the alkyl group of $R^2$ is preferably 1 to 6, more preferably 1 to 4, still more preferably 1 or 2, and particularly preferably 1.

$R^2$ is preferably a hydrogen atom.

The linking group of $L^1$ is preferably a (m+1) valent aliphatic hydrocarbon group, a (m+1) valent aromatic hydrocarbon group, or a (m+1) valent linking group in which a moiety connecting to —O— of the above-shown ester bond is an aliphatic hydrocarbon group or an aromatic hydrocarbon group and also said moiety and —O—, —S—, —N(Ra)(Rb)-, an aliphatic hydrocarbon group or an aromatic hydrocarbon group are combined. Herein, Ra and Rb each independently represent a hydrogen atom or a substituent.

$L^1$ is preferably a (m+1) valent aliphatic hydrocarbon group. The number of carbon atom of said aliphatic hydrocarbon group is preferably 1 to 10, more preferably 1 to 8, still more preferably 1 to 4, especially preferably 1 or 2, and most preferably 1.

m is preferably an integer of 1 to 10, more preferably an integer of 1 to 5, still more preferably 1 to 2, and particularly preferably 1.

The number of carbon atom of the alkyl group of $R^{11}$ and $R^{12}$ is preferably 1 to 4, more preferably 1 or 2, and still more preferably 1.

For $R^{11}$ and $R^{12}$, the case where one is a hydrogen atom and the other is an alkyl group, or the case where both are a hydrogen atom is preferred. The case where both are a hydrogen atom is more preferred.

Examples of the halogen atom of $R^{11}$ and $R^{12}$ include a fluorine atom, a chlorine atom, a bromine atom and an iodine atom, and among these, a fluorine atom, a chlorine atom and a bromine atom are preferred. A chlorine atom is more preferred.

Examples of the aryl group of $Ar^{11}$ include a phenyl group which may have a substituent, or a naphthyl group which may have a substituent and a phenyl group which may have a substituent is more preferred.

Examples of the above-described substituent include an alkyl group, an alkenyl group, an aryl group, a heterocyclic group, a halogen atom, a hydroxyl group, an alkoxy group, an aryloxy group, an alkylthio group, an arylthio group, an acyloxy group, an acyl group, an amino group, an acylamino group, a carbamoyl group, a sulfonamide group, a sulfamoyl group, an alkoxycarbony group, an aryloxycarbony group, an alkyl- or aryl-sulfonyl group, and a nitro group.
(Polypropylene)

The polypropylene to be graft-modified may be a copolymer with ethylene or α-olefin. However, in the present invention, a propylene homopolymer is preferred.

Further, the stereoregularity (tacticity) of the methyl group at the side chain may be any of isotactic, syndiotactic, or atactic regularity, or may be a mixture thereof. However, in the present invention, the isotactic regularity is more preferred. The isotactic polypropylene is crystalline and may contain several percent by mass, for example 5% by mass, or less of atactic polypropylene.
(Graft-Modification Component)

In the present invention, in the polypropylene having an epoxy group at the side chain, at least a graft-modification component (a monomer for constituting the graft chain) is a (meth)acrylate containing an epoxy group.
1. (Meth)Acrylate Containing an Epoxy Group In the present invention, a compound represented by the following Formula (1A) is preferred.

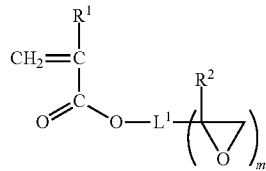

Formula (1A)

In the formula, $R^1$, $R^2$, $L^1$ and m each have the same definition as $R^1$, $R^2$, $L^1$ and m in Formula (1) and a preferable range is also the same.

Examples of the compound represented by Formula (1A) include glycidyl acrylate, glycidyl methacrylate, 1,2-epoxy-2-propyl acrylate, 1,2-epoxy-2-propyl methacrylate, 2,3-epoxypropyl acrylate, 2,3-epoxypropyl methacrylate, 2-(2,3-epoxypropylthio)ethyl acrylate, 2-(2,3-epoxypropylthio)ethyl methacrylate, 4-(2,3-epoxypropyloxymethyl)phenyl acrylate, 4-(2,3-epoxypropyloxymethyl) phenyl methacrylate, 3-(2,3-epoxypropyloxy)phenyl acrylate, 3-(2,3-epoxypropyloxy)phenyl methacrylate, 3,4-bis(2,3-epoxypropyloxy)phenyl acrylate, 3,4-bis(2,3-epoxypropyloxy)phenyl methacrylate, 3-(2,3-epoxypropylthio)phenyl acrylate, 3-(2,3-epoxypropylthio)phenyl methacrylate, 4-(2,3-epoxypropylcarbonyl)phenyl acrylate, 4-(2,3-epoxypropylcarbonyl) phenyl methacrylate, 3-(2,3-epoxypropyloxy)-2,2-bis(2,3-epoxypropyloxymethyl)propyl acrylate, 3-(2,3-epoxypropyloxy)-2,2-bis(2,3-epoxypropyloxymethyl) propyl methacrylate, 3-[3-(2,3-epoxypropyloxy)-2,2-bis(2,3-epoxypropyloxy)]-(2,3-epoxypropyloxy)-2,2-bis(2,3-epoxypropyloxymethyl) propyl acrylate, 3-[3-(2,3-epoxypropyloxy)-2,2-bis(2,3-epoxypropyloxy)]-(2,3-epoxypropyloxy)-2,2-bis(2,3-epoxypropyloxymethyl) propyl methacrylate and the like.

One of these may be used alone, or two or more of these may be used in combination. However, it is preferable to use one of these alone.

In the present invention, as the compound represented by Formula (1A), glycidyl acrylate and glycidyl methacrylate are preferred and glycidyl methacrylate is more preferred.

In the content of a graft-modification component in the graft-modified polypropylene, with respect to 100 parts by mass of said polypropylene, a component obtained from the (meth)acrylate containing an epoxy group is 0.5 to parts by mass, preferably 2 to 7 parts by mass, and more preferably 3 to 5 parts by mass.

If the component obtained from the (meth)acrylate containing an epoxy group is less than 0.5 parts by mass, it is difficult to obtain a substantial peel strength-enhancing effect due to interaction between a glass surface and an epoxy group.

Adversely, if the component is more than 10 parts by mass, because there are too much epoxy components, viscosity of the composition increases due to a reaction between a glass surface and an epoxy group during kneading of the glass fiber. Increase of viscosity causes a problem of formability, so that production becomes difficult.
2. Aromatic Vinyl Compound In the present invention, a compound represented by the following Formula (2A) is preferred.

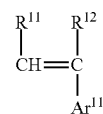

Formula (2A)

In the formula, $R^{11}$, $R^{12}$ and $Ar^{11}$ each have the same definition as $R^{11}$, $R^{12}$ and $Ar^{11}$ in Formula (2) and a preferable range is also the same.

Examples of the compound represented by Formula (2A) include styrene, o-methyl styrene, m-methyl styrene, p-methyl styrene, α-methyl styrene, β-methyl styrene, dimethyl styrene, chlorostyrenes, such as o-chlorostyrene, m-chlorostyrene, p-chlorostyrene, α-chlorostyrene, β-chlorostyrene, dichlorostyrene, and trichlorostyrene, o-bromostyrene, m-bromostyrene, p-bromostyrene, dibromostyrene, tribromostyrene, o-fluorostyrene, m-fluorostyrene, p-fluorostyrene, difluorostyrene, trifluorostyrene, o-nitrostyrene, m-nitrostyrene, p-nitrostyrene, di-nitrostyrene, trinitrostyrene, o-hydroxynitrostyrene, m-hydroxynitrostyrene, p-hydroxynitrostyrene, dihydroxynitrostyrene, trihydroxynitrostyrene, o-divinylbenzene, m-divinylbenzene, p-divinylbenzene, o-diisopropenylbenzene, m-diisopropenylbenzene, and p-diisopropenylbenzene.

One of these may be used alone, or two or more of these may be used in combination. However, it is preferable to use one of these alone.

Among these, styrene compounds whose benzene ring may have a substituent are preferred, and styrene (that is, an unsubstituted styrene compound) is more preferred.

In the content of a graft-modification component in the graft-modified polypropylene, with respect to 100 parts by mass of the polypropylene, a component obtained from the aromatic vinyl compound has a mass equal to or less than the above-described component obtained from the (meth)acrylate. However, the component obtained from the aromatic vinyl compound is preferably 0.9 times or less, and more preferably 0.8 times or less, of the above-described component obtained from the (meth)acrylate.

The aromatic vinyl compound is preferably used because when polypropylene is graft-modified, this compound suppresses a molecular chain scission of said polypropylene. The lower limit of the content is preferably 0.1 times or more, more preferably 0.2 times or more, and still more preferably 0.5 times or more, with respect to the mass of the component obtained from the (meth)acrylate.

(By-Product Obtained from Graft-Modification Component)

The glass fiber-reinforced polyolefin resin material of the present invention contains a graft-modified polypropylene modified with a (meth)acrylate containing an epoxy group or an aromatic vinyl compound, and may contain a polymer obtained by these components.

Examples of the polymer include a polypropylene at a main chain of which a unit structure of the above-described Formula (1) is incorporated, an oligomer or polymer of the (meth)acrylate containing an epoxy group, an oligomer or polymer of the aromatic vinyl compound, and unreacted (meth)acrylate containing an epoxy group or aromatic vinyl compound.

<Acid Anhydride>

In the present invention, an acid anhydride is contained.

The acid anhydride is preferably an organic acid anhydride and may be a compound (monomer) or a polymer having an acid anhydride structure. However, in the present invention, such polymer is preferred.

Examples of the compound (monomer) having an acid anhydride structure include a cyclic or chain anhydride of aromatic polycarboxylic acids or aliphatic polycarboxylic acids. Such compound is preferably a cyclic anhydride, more preferably a cyclic anhydride of aromatic polycarboxylic acids, and still more preferably a phthalic anhydride that may have a substituent.

Further, in a case where the acid anhydride structure is cyclic, a 5-membered ring or 6-membered ring is preferred and a 5-membered ring is more preferred.

Examples of the substituent in the phthalic anhydride that may have a substituent include an alkyl group, an alkenyl group, an aryl group, a heterocyclic group, a halogen atom, a hydroxyl group, an alkoxy group, an aryloxy group, an alkylthio group, an arylthio group, an acyloxy group, an acyl group, an amino group, an acylamino group, a carbamoyl group, a sulfonamide group, a sulfamoyl group, an alkoxycarbonyl group, an aryloxycarbonyl group, an alkyl- or aryl-sulfonyl group, a nitro group, a carboxyl group, and a sulfo group.

In a case where phthalic acid has 2 carboxyl groups as the substituent, these carboxyl groups may be further subjected to a dehydration cyclocondensation to form an acid anhydride structure, which results in pyromellitic dianhydride.

Examples of the compound (monomer) having an acid anhydride structure include maleic anhydride, itaconic anhydride, citraconic anhydride, tetrahydro phthalic anhydride, bicyclo [2, 2, 1]hept-2-en-5,6-dicarboxylic anhydride, phthalic anhydride, 4-methylphthalic anhydride, 4-chlorophthalic anhydride, 4-tertiallybutyl phthalic anhydride, 4,5-di-chlorophthalic anhydride, tetrachlorophthalic anhydride, tetrafluorophthalic anhydride, tetrabromophthalic anhydride, trimellitic dianhydride, and pyromellitic anhydride, or include 4,4'-carbonyldiphthalic anhydride, 4,4'-oxydiphthalic anhydride, 4,4'-(hexafluoroisopropylidene) diphthalic anhydride, and 4,4'-biphthalic anhydride.

As for the polymer having an acid anhydride structure, an acid anhydride-modified polyolefin is preferred and an acid anhydride-modified polypropylene is more preferred. Further, as for the acid anhydride modification, the modification with a cyclic acid anhydride having a double bond is preferred and a graft modification is more preferred.

Examples of the modifying acid anhydride include maleic anhydride, itaconic anhydride, and citraconic anhydride and in particular, maleic anhydride is preferred.

The maleic anhydride is contained in an amount of 1 to 20 parts by mass with respect to 100 parts by mass of the above-described graft-modified polypropylene.

In the present invention, by using an acid anhydride, adhesion between the glass surface of the glass fiber and a base resin is improved and thereby a mechanical strength is increased.

Further, on the surface of the adherend, metal surface in particular, a ring-opening reaction of the epoxy group is accelerated at the time of adhesion and therefore improvement in adhesion can be also expected.

<Glass Fiber>

In the present invention, an average diameter of the glass fiber is desirably 30 µm or less. On the other hand, in order to develop enough strength, an average length thereof is desirably 0.2 mm or more.

An average diameter is preferably 2 to 30 µm, more preferably 5 to 25 µm, and still more preferably 10 to 20 µm. Further, an average length is preferably 0.2 mm or more, more preferably 0.25 mm or more, and more preferably 0.3 mm or more.

Meanwhile, the upper limit of the average length of the glass fiber is not particularly limited. However, in practice, it is common that the average length of the glass fiber existing in the formed body is 1.2 mm or less.

The glass fiber may be subjected to a surface treatment and those subjected to a silane treatment are preferred.

Examples of the silane treatment include a coupling treatment due to amino silane, epoxy silane, or vinyl silane and the like. Specifically, examples thereof include amino silane such as γ-aminopropyltriethoxy silane; epoxy silane such as γ-glycidoxypropyltrimethoxy silane; and vinyl silane such as vinyl trichloro silane.

In the present invention, the glass fiber is contained in an amount of 30 to 80 parts by mass, preferably 35 to 70 parts by mass, and more preferably 40 to 60 parts by mass, with respect to 100 parts by mass of the above-described graft-modified polypropylene.

As a reinforcing agent, a glass fiber and other fibers may be used in combination. In the present invention, however, it is preferred to use only a glass fiber in order to adjust a mechanical strength and a temporary adhesion.

<Other Additives>

In the present invention, if needed, inorganic fillers, for example, talc, calcium carbonate, mica, or organic fillers, for example, polyester, polyimide fibers and the like; and as for the rest, a variety of additives such as a flame retardant, a stabilizer, an antioxidant, an infrared absorber, a plasticizer, a lubricant, and the like; a colorant such as a dye and pigment can be added.

<<Properties of Glass Fiber-Reinforced Polyolefin Resin Materials>>

In the present invention, the glass fiber-reinforced polyolefin resin material preferably has the following properties.

<Tensile Strength>

The tensile strength in conformity to JIS K 7161 of the sheet formed from the glass fiber-reinforced polyolefin resin material is preferably 80 MPa or more. The tensile strength is more preferably 85 MPa or more, and still more preferably 90 MPa or more. The upper limit thereof is 230 MPa or less in practice.

First, a test specimen is prepared by molding pellets of the glass fiber-reinforced polyolefin resin material using an injection molding machine [for example, ROBOSHOT α-30C, manufactured by Fanuc Corporation] in conformity to the Test Specimen Model 5 prescribed in JIS K 7127. Then, the tensile strength is obtained by measuring the test specimen by means of a tensile tester [for example, INSTRON TESTER Model 5567, manufactured by Instron Co., Ltd.] under the conditions of gauge length: 25 mm and test speed: 50 mm/min.

<Peel Strength>

In the present invention, with respect to a 2 mm-thick sheet formed by adhering a glass fiber-reinforced polyolefin resin material to an aluminum sheet, the peel strength by a 180° peel test after leaving, for 5 minutes at 220° C., the 2 mm-thick sheet in the condition of being placed in contact with a 0.1 mm-thick aluminum sheet having the same area while applying a pressure thereto, is preferably 1.6 N/mm or more.

The peel strength is more preferably 1.8 N/mm or more, and still more preferably 2.0 N/mm or more. The upper limit thereof is realistically 20.0 N/mm or less, more preferably 1.5 N/mm or less, and still more preferably 12.0 N/mm or less.

Measurement of the peel strength can be carried out in conformity to JIS K6854-2.

Specifically, first, a sample is prepared by molding pellets of the glass fiber-reinforced polyolefin resin material on an aluminum sheet of the adherend using an injection molding machine [for example, ROBOSHOT α-30C, manufactured by Fanuc Corporation] so that the pellets get to the same thickness as the aluminum sheet of the adherent.

This sample is left for 5 minutes at 220° C. in the condition of being placed in contact with an aluminum sheet (thickness: 0.1 mm) while applying a pressure thereto, and then after lowering a pressing plate temperature to 40° C. by a water cooling system while maintaining a pressurized state, the sample is taken out to thereby prepare a sample test specimen.

Dealing with the aluminum sheet of this test specimen as a deflection adherend, the 180° peel test is conducted to measure peel strength (N/mm) that is an indicator of the adhesion force.

Preparing a test specimen in the same way and repeating the measurement of the peel strength (N/mm) 5 times to find the average value, this average value obtained is defined as the peel strength.

The tensile strength and the peel strength can be adjusted by a kind and an amount of the graft-modified polypropylene and a kind and an amount of the (meth)acrylate having an epoxy group or the aromatic vinyl compound each of which constitutes the graft-modified polypropylene; a kind and a content of the acid anhydride; and a kind and an amount of the glass fiber.

<<Composition for Glass Fiber-Reinforced Polyolefin Resin Materials>>

The glass fiber-reinforced polyolefin resin materials of the present invention can be produced by employing a composition for the glass fiber-reinforced polyolefin resin material.

In particular, this is preferably produced by subjecting the composition for the glass fiber-reinforced polyolefin resin material to a graft reaction.

The composition for the glass fiber-reinforced polyolefin resin material contains at least a thermoplastic resin containing polypropylene and, with respect to 100 parts by mass of said polypropylene, from 30 to 80 parts by mass of a glass fiber, from 1 to 20 parts by mass of a compound or polymer having an acid anhydride structure form, from 0.1 to 0.6 parts by mass of an organic peroxide having an 1-minute half-life temperature of 130° C. or more and 175.2° C. or less, from 0.5 to 10 parts by mass of a (meth)acrylate containing an epoxy group, and an aromatic vinyl compound having a mass equal to or less than said (meth)acrylate.

The polypropylene, the glass fiber, the above-described acid anhydride, the (meth)acrylate containing an epoxy group, and the aromatic vinyl compound, each of which is to be used, are the same as already explained.

<Organic Peroxide>

The organic peroxide is a radical polymerization initiator for subjecting the polypropylene to a graft reaction.

The organic peroxide is a compound having at least a carbon atom and a —O—O— bond and examples thereof include ketone peroxide, a peroxy ketal, hydro peroxide, a dialkyl peroxide, an acyl peroxide, an alkyl peroxyester, a diacyl peroxide, a monoperoxy carbonate, and a peroxy dicarbonate.

Among these, in the present invention, a peroxy ketal, a dialkyl peroxide, a diacyl peroxide, an alkyl peroxyester, and a monoperoxy carbonate are preferred and in particular, a dialkyl peroxide is preferred.

Specific examples of the organic peroxide include the followings examples:

(1) Ketone Peroxide Compounds

Cyclohexanone peroxide, linear methylethyl ketone peroxide, and the like (2) Peroxy Ketal Compounds 1,1-bis(t-butylperoxy)-3,3,5-trimethylcyclohexane, 1,1-bis(t-butylperoxy)-cyclohexane, 2,2-bis(t-butylperoxy)octane, n-butyl-4,4-bis(t-butylperoxy)valerate, 2,2-bis(t-butylperoxy)butane, cyclic methylethyl ketone peroxide, and the like (3) Hydro Peroxide Compounds t-butyl peroxide, t-butylcumyl peroxide, and the like (4) Dialkyl Peroxide Compounds Di t-butyl peroxide, t-butylcumyl peroxide, dicumyl peroxide, α,α'-bis(t-butylperoxy-m-isopropyl)benzene, 2,5-dimethyl-2,5-di(t-butylperoxy) hexane, 2,5-dimethyl-2,5-di(t-butylperoxy)hexyne-3, and the like (5) Acyl Peroxide Compounds Acetyl peroxide, isobutyryl peroxide, octanoyl peroxide, decanoyl peroxide, lauroyl peroxide, 3,5,5-trimethylhexamoyl peroxide, succinic acid peroxide, benzoyl peroxide, 2,4-dichlorobenzoyl peroxide, m-toluoyl peroxide, and the like (6) Alkyl Peroxyester Compounds t-Butyl peroxyacetate, t-butyl peroxyisobutylate t-butyl peroxypivalate, t-butyl peroxyneodecanoate, cumylperoxyneodecanoate, t-butyl peroxy-2-ethyl hexanoate, t-butyl peroxyl-3,5,5-trimethyl hexanoate, t-butyl peroxylaulate, t-butyl peroxybenzoate, di t-butyl peroxy isophthalate, 2,5-dimethyl-2,5-di (benzoylperoxy)hexane, t-butyl peroxymaleic acid, t-butyl peroxyisopropyl carbonate, cumyl peroxyoctoate, t-hexylperoxy neodecanoate, t-hexyl peroxypivalate, t-butyl peroxyneohexanoate, t-hexyl peroxyneohexanoate, cumyl peroxyneohexanoate, and the like (7) Diacyl Peroxide Compounds Diacetyl peroxide, diisobutyl peroxide, dioctanoyl peroxide, didecanoyl peroxide, dilauloyl peroxide, bis(3,5,5-trimethylhexanoyl) peroxide, dibenzoyl peroxide, bis(2,4-dichlorobenzoyl) peroxide, bis(m-toluoyl) peroxide, and the like (8) Monoperoxy Carbonate Compounds t-Butyl peroxyisopropyl carbonate, t-amyl peroxy-2-ethylhexyl carbonate, and the like (9) Peroxy Dicarbonate Compounds Di n-propyl peroxy dicarbonate, diisopropyl peroxy dicarbonate, di s-butyl peroxy dicarbonate, bis(4-t-butylcyclohexylperoxy) dicarbonate, bis(2-ethylhexyl peroxy dicarbonate, and the like The organic peroxide used in the present invention is an organic peroxide having an 1-minute half-life temperature of 130° C. or more and 175.2° C. or less.

If the 1-minute half-life temperature of the organic peroxide is too higher than the above-described range, a temperature setting of the twin-screw extruder becomes difficult. In reverse, if it is too lower than the range, the organic peroxide itself becomes unstable, which results in decomposition during storage.

The setting of the 1-minute half-life temperature of the organic peroxide to the above-described range allows a heat kneading by a twin-screw extruder to be commonly carried out, whereby a graft reaction proceeds sufficiently and also it becomes possible to disperse a glass fiber uniformly in a thermoplastic resin such as polyethylene.

The 1-minute half-life temperature of the organic peroxide is evaluated by preparing a 0.1 mole/L concentration of the organic peroxide solution using a relatively inactive solvent such as benzene and the like, and then measuring a temporal alteration in concentration of the organic peroxide when subjected to a heat decomposition (see "Kakyo-zai Handbook (Crosslinking Agent Handbook in English) (first edition)" published by Taiseisha Co., Ltd., p. 162).

The content of the organic peroxide is preferably from 0.1 to 0.6 parts by mass, more preferably from 0.1 to 0.5 parts by mass, further more preferably from 0.1 to 0.4 parts by mass, and still more preferably from 0.1 to 0.3 parts by mass, with respect to 100 parts by mass of polypropylene.

If the content of the organic peroxide is less than 0.1 parts by mass, the graft reaction of the (meth)acrylate monomer hardly proceeds, so that adhesion power of 1.6 N/mm or more is not achieved. In reverse, if it is more than 0.6 parts by mass, the amount of radical generated becomes too large, so that since the decomposition reaction of polypropylene proceeds vigorously, strength of the material is lowered and therefore it becomes difficult to develop tensile strength of 80 MPa or more.

<Components Other than Organic Peroxide>

The polypropylene is not particularly limited, as long as it is a polypropylene homopolymer and a propylene copolymer in which a content of the monomer components other than the propylene component is 50% by mass or less. However, from the viewpoint of high stiffness and low price, a propylene homopolymer is preferred. From the points of view that both stiffness and impact resistance are high, a block copolymer of propylene and a monomer other than propylene is preferred.

In particular, as for the polypropylene homopolymer or the block copolymer of propylene and a monomer other than propylene each of which is used in the present invention, those having a melt mass-flow rate (MFR) of 0.1 to 60 g/10 min at 230° C. and 2.16 kg load are preferred.

If it is less than this value, formability becomes poor. In reverse, if the value is more than this, since the molecular weight is low, this causes a problem that physical properties of the composition obtained are deteriorated by reduction in the molecular weight due to a reaction with organic peroxide.

The content of the glass fiber is 30 to 80 parts by mass with respect to 100 parts by mass of polypropylene and a preferable range thereof is the same as described in <<Glass fiber-reinforced polyolefin resin material>>

If the content of the glass fiber is less than 30 parts by mass, since a sufficient enforcement effect is not obtained, strength decreases. In reverse, if the content exceeds 80 parts by mas, since the glass component is too much, this causes a problem of handling ability such as formability and kneading property, or a problem of practical use such that impact resistance as a glass fiber-reinforced polyolefin resin material becomes extremely poor.

As a reinforcing agent, a glass fiber and other fibers may be used in combination. In the present invention, however, it is preferred to use only a glass fiber in order to adjust a mechanical strength and a temporary adhesion.

Meanwhile, as for the glass fiber to be added to a composition for the glass fiber-reinforced polyolefin resin material, a chopped strand of the alkali-free glass (E-glass) is preferred in the present invention. Among these, those in a range of a single fiber diameter (average diameter) of 5 to 18 μm and a fiber length (average length) of 1.0 to 27.0 mm are preferred. If the single fiber diameter and the fiber length are respectively less than their lower limits, breaking strength of the glass fiber itself decreases, or since original fiber length to be added is too short, the breaking proceeds due to a force at the time of kneading, whereby L/D of the glass fiber existing in the above-described composition becomes small and it becomes difficult to obtain a desired strength. On the other hand, if the single fiber diameter and the fiber length each respectively exceed the above-described upper limit, since a glass fiber is large, the nature as a foreign substance in the resin of the glass fiber-reinforced polyolefin resin material formed becomes stronger, so that the glass fiber sometimes adversely affects mechanical properties such as impact strength.

The content of the acid anhydride is 1 to 20 parts by mass with respect to 100 parts by mass of polypropylene and a preferable range is the same as described in <<Glass fiber-reinforced polyolefin resin material>>.

If the content of the acid anhydride is less than 1 part by mass, adhesion at the interface between polypropylene and the glass fiber becomes insufficient and resultantly a strength as a glass fiber-reinforced polyolefin cannot be obtained. If the content exceeds 20 parts by mass, since the system reaches at a state of too much acid anhydride, an interaction with the glass surface becomes stronger to thereby decrease fluidity. This causes a problem of formability, which results in difficulty of production.

Polyolefin of the maleic anhydride-modified polyolefin is not particularly limited, as long as it has a good compatibility to a base resin. As for the maleic anhydride-modified polyolefin, a maleic anhydride-modified polyethylene, a maleic anhydride-modified polypropylene and a maleic anhydride-modified polystyrene are preferred. However, a maleic anhydride-modified polyethylene and a maleic anhydride-modified polypropylene are more preferred. Further, maleic anhydride-modified copolymers derived from 2 kinds of monomers selected from the group consisting of ethylene, propylene and styrene are also preferred.

Examples of the maleic anhydride-modified polyethylene and the maleic anhydride-modified polypropylene include a maleic anhydride-modified polyethylene-polypropylene copolymer, a maleic anhydride-modified ethylene-α-olefin copolymer (ethylene-vinyl acetate copolymer, ethylene-hexene copolymer, ethylene-octene copolymer, and the like), and styrene/ethylene/butylene/styrene (SEBS) having a group containing maleic anhydride. Further, as a polar group to be graft- or co-polymerized, not only maleic anhydride, but also a polar group (alkylene glycol-based, or (meth) acrylic acid-based monomer components) may be contained.

Of these, particularly preferred are a maleic anhydride-modified polyolefin (polyethylene, polypropylene, polystyrene, or a copolymer of them), a maleic anhydride-modified ethylene-propylene copolymer, a maleic anhydride-modified ethylene-α-olefin copolymer (ethylene-vinyl acetate copolymer, ethylene-hexene copolymer, ethylene-octene copolymer, or the like), and styrene/ethylene/butylene/styrene (SEBS) having a group containing maleic anhydride.

As for the maleic anhydride-modified polyolefin resin, a maleic anhydride-modified polypropylene is most preferred. In particular, a maleic anhydride-modified polypropylene having a melt mass-flow rate (MFR) of 0.1 to 200 g/10 min, and especially 1.0 to 60 g/10 min, at 230° C. and 2.16 kg load is preferred. Further, a maleic anhydride-modification rate [a mass of the maleic anhydride reacted with a side chain of the polyolefin in a maleic anhydride-modified polyolefin, divided by a mas of the maleic anhydride-modified polyolefin, and then multiplied by 100(%)] is preferably 0.1 to 2.0%, more preferably 0.1 to 1.5%, and most preferably 0.1 to 1.0%.

If the modification rate is less than the above-described lower limit, sufficient adhesion strength at the resin-glass interface cannot be obtained even in a preferable range of the blending amount, which results in reduction of strength. On the other hand, if the modification rate exceeds the above-described upper limit, adhesion strength between the resin and the glass becomes too strong, so that since the fluidity as a composition falls, this sometimes causes a problem of the formability.

It is preferable that the acid anhydride unlike an organic or inorganic acid maintains an acid anhydride structure until the acid anhydride is adhered to an adherend. By this, the ring opening of an epoxy group is suppressed until the acid anhydride is adhered to the adherend.

The content of the (meth)acrylate having an epoxy group is 0.5 to 10 parts by mass with respect to 100 parts by mass of the polypropylene.

The above-described content of the (meth)acrylate having an epoxy group is preferably 2 to 7 parts by mass, and more preferably 3 to 5 parts by mass.

The epoxy group incorporated in the polypropylene allows a chemical bond with a group, for example, a hydroxyl group, existing at a glass surface of the glass fiber and an adherent surface.

If the content of the (meth)acrylate having an epoxy group is less than 0.5 part by mass, the (meth)acrylate having an epoxy group may not be incorporated in the polypropylene. On the other hand, if it exceeds 10 parts by mass, the strength of the glass fiber-reinforced polyolefin decreases. It is presumed that this is caused by the follows: the (meth) acrylate component becomes overmuch with respect to the organic peroxide to be blended, so that since a radical reaction is likely to occur preferentially to the (meth)acrylate component, a oligomer or polymer component composed of the (meth)acrylate component or the aromatic vinyl compound resultantly becomes overmuch; and this causes interference of the interface adhesion between the glass component and the polypropylene component.

The content of the aromatic vinyl compound is a mass equal to or less than the (meth)acrylate having an epoxy group.

The content of the aromatic vinyl compound is the same as a preferable amount of the above-described (meth)acrylate having an epoxy group and a range described in <<Glass fiber-reinforced polyolefin resin material>> is more preferred.

<Other Additives>

Additives described in <<Glass fiber-reinforced polyolefin resin material>> may be used, if needed.

<<Method of Producing Glass Fiber-Reinforced Polyolefin Resin Material>>

In the present invention, it is preferable that a composition for a glass fiber-reinforced polyolefin resin material is subjected to graft reaction to thereby produce the glass fiber-reinforced polyolefin resin material.

The graft reaction may be conducted by any types of apparatus under any conditions, as long as the graft reaction proceeds.

However, the kneading temperature is equal to or more than the decomposition temperature of the organic peroxide existing in the composition, and is preferably a temperature by 10 to 20° C. higher than 1-minute half-life temperature of the organic peroxide used.

Meanwhile, although the stirring is not particularly limited, for example, it is enough to conduct the stirring at the rotating speed of 100 rpm with a screw diameter of 15 mm and L/D=45.

In the present invention, it is preferable to conduct a heat kneading by a twin screw extruder [for example, KZW15TW-45MG-NH, manufactured by Technovel Corporation], and it is more preferable to conduct a heat kneading by casting each of components respectively into a hopper of the twin screw extruder with a screw diameter of 15 mm and L/D=45 under the condition of a screw rotating speed of 100 rpm through a feeder controlled by a gravimetric feed system per hour, and by setting the barrel temperature in the kneading zone to a temperature higher by 20° C. than the 1-minute half-life temperature of the organic peroxide.

Meanwhile, each of components may be cast or added in any way. However, of the each of components, it is preferable to cast polypropylene, the (meth)acrylate having an epoxy group, the aromatic vinyl compound and the acid anhydride at the same time to a twin screw extruder through a feeder controlled by a gravimetric feed system per hour and to cast a glass fiber from a side feeder along the way through a feeder controlled by a gravimetric feed system per hour.

In this way, by passing these components once through the twin screw extruder, the glass fiber-reinforced polyolefin resin material can be produced in one kneading.

The glass fiber-reinforced polyolefin resin material can be manufactured into any fabricated article by making it into a pellet.

<<Use for Glass Fiber-Reinforced Polyolefin Resin Materials>>

Since the glass fiber-reinforced polyolefin resin materials of the present invention show excellent mechanical strength and also excellent adhesion, particularly adhesion to metals, they can be used for a variety of applications.

Of these, in the present invention, a type of usage as a composite of a metal and the glass fiber-reinforced polyolefin resin material is preferred. Further, in the present invention, a composite comprising a laminate of the metal and the glass fiber-reinforced polyolefin resin material is more preferred.

Examples of the applications include a material for a vehicle such as an automobile and a two-wheeled vehicle, a structural member of a robot arm, a robot part for amusement, a prosthesis member, a material for electrical appliances, an OA device housing, a building material member, drainage facilities, a toiletry material, various tanks, a container, a sheet, a toy, and sport goods.

Examples of the material for the vehicle include: an interior part such as a door trim, a pillar, an instrumental panel, a console, a rocker panel, an armrest, an inner panel of door, a spare tire cover and a door knob; an exterior part such as a bumper, a spoiler, a fender, a side step and an outer panel of door; other parts such as an air intake duct, a coolant reserve tank, a radiator reserve tank, a window-washer tank, a fender liner and a fan, and an integrally formed part such as a front-end panel.

In a case where the adherend is a metal, preferred are aluminum, iron, copper, stainless-steel, and an alloy of them. Of these, aluminum is preferred.

In the present invention, in the case where the adherend is a metal, a group, for example a hydroxyl group, which is reactive with an epoxy group exists on the metal surface and chemically bonds with an epoxy group of the graft-modified polypropylene, so that these can adhere to each other.

In the case where the adherend is a metal, in particular, a structural member such as an aircraft and a vehicle, and sport goods are preferred, and a structural member such as an aircraft and a vehicle is more preferred.

EXAMPLES

The present invention will be described in more detail based on examples given below, but the invention is not meant to be limited by these.

The materials utilized are described below.

<Materials that are Utilized>

(1) Base Resin

Polypropylene (PP): PRIME POLYPRO J106MG manufactured by Prime Polymer Co., Ltd.

MFR (230° C./2.16 kg)=15 g/10 min, Density=0.90 g/cm$^3$ (2) Graft Modification Monomer Glycidyl methacrylate: BRENMER G manufactured by NOF Corporation Styrene: (special grade) styrene manufactured by Wako Pure Chemical Industries, Ltd.

(3) Organic Peroxide

Di-cumyl peroxide: PERCUMYL D manufactured by NOF Corporation 1-Minute half-life temperature=175.2° C.

(4) Acid Anhydride

Maleic anhydride graft-modified polypropylene: MODIC P908 manufactured by Mitsubishi Chemical Corporation Pyromellitic anhydride (PMDA): Product by Daicel Corporation (5) Reinforcement Fiber Glass fiber: CS (F) 3-PP-960S manufactured by Nitto Boseki Co., Ltd. Cut length 3 mm, Filament diameter 13 μm, Silane treatment Carbon fiber: PILOFIL HT-series TRH50 60M manufactured by Mitsubishi Rayon Co., Ltd.

Robing filament diameter 6 μm

Example 1

Each of components were cast to a hopper of the twin screw extruder [KZWI5TW-45MG-NH, manufactured by Technovel Corporation] with a screw diameter of 15 mm and L/D=45 through a feeder controlled by a gravimetric feed system per hour so as to be 5 parts by mass of glycidyl methacrylate, 3.8 parts by mass of styrene, 16.5 parts by mass of maleic anhydride graft-modified polypropylene and 0.2 parts by mass of dicumyl peroxide, with respect to 100 parts by mass of polypropylene.

Further, the glass fiber were added from a side feeder along the way through a feeder controlled by a gravimetric feed system per hour so as to be 50 parts by mass of the glass fiber with respect to 100 parts by mass of polypropylene.

By this, a composition for the glass fiber-reinforced polyolefin resin material was obtained and at the same time, the composition was subjected to a graft reaction in the twin screw extruder.

A resin obtained from the composition for the glass fiber-reinforced polyolefin resin material by setting the barrel temperature to from 10 to 20° C. higher than 1-minute half-life temperature of the organic peroxide and by heat kneading at a screw rotating speed of 100 rpm, was made into a pellet. By drying it at 80° C. for 24 hours, a pellet of the glass fiber-reinforced polyolefin resin material used in Example 1 was obtained.

Examples 2 to 10, and Comparative Examples 1 to 4

A pellet of each of the glass fiber-reinforced polyolefin resin materials used in Examples 2 to 10 and Comparative Examples 1 to 4 was obtained in the same manner as in Example 1, except that the kind and the blending amount of each component were changed as shown in the following Tables 1 and 2.

Meanwhile, because the carbon fiber of trade name: PILOFIL HT-series TRH50 60M [manufactured by Mitsubishi Rayon] was in the robing form, the carbon fiber was cut into 3 mm length pieces beforehand and was used. {0099} (Measurement of 1-Minute Half-Life Temperature of the Organic Peroxide)

The 1-minute half-life temperature which is a temperature when the amount of active oxygen generated by a heat decomposition of the organic peroxide in a minute reaches a half of the amount of active oxygen before the heat decomposition was measured as follows:

0.1 mole/L concentration of a benzene solution of organic peroxide was prepared and then the 1-minute half-life temperature was obtained by measuring a temporal change in concentration of the organic peroxide when subjected to heat decomposition.

Using the pellet of each of the glass fiber-reinforced polyolefin resin materials obtained as described above, the tensile strength and the peel strength were measured as follows:

(Measurement of Tensile Strength)

A test specimen was prepared by molding a pellet of each of the glass fiber-reinforced polyolefin resin materials obtained, using an injection molding machine [ROBOSHOTα-30C, manufactured by Fanuc Corporation] in conformity to the test specimen model 5 prescribed in JIS K 7127.

The tensile strength (MPa) of the test specimen obtained was measured using a tensile tester [INSTRON TESTER Model 5567, manufactured by Instron Co., Ltd.] under the conditions of gauge length: 25 mm and test speed: 50 mm/min in conformity to JIS K 7161.

(Measurement of Peel Strength)

Measurement of the peel strength was conducted in conformity to JIS K6854-2.

A 2 mm-thick strip sample (2 cm or more in width) was prepared by molding a pellet of each of the glass fiber-reinforced polyolefin resin materials obtained, using an injection molding machine [ROBOSHOT α-30C, manufactured by Fanuc Corporation]

This sample was left for 5 minutes at 220° C. in the condition of being placed in contact with a pure aluminum sheet (thickness: 0.1 mm) while applying a pressure thereto, and then after lowering a pressing plate temperature to 40° C. by a water cooling system while maintaining a pressurized state, the sample was taken out to prepare a sample test specimen.

Dealing with the aluminum sheet of this test specimen as a deflection adherent, 180° peel test was conducted using a tensile tester (INSTRON TESTER Model 3382, manufactured by Instron Co., Ltd.) to measure peel strength (N/mm) that is an indicator of the adhesion strength.

In the same way, the test specimens were prepared and measurement of the peel strength (N/mm) was repeated 5 times to obtain its average value. This average value was defined as the peel strength.

The results obtained are collectively shown in Tables 1 and 2.

Herein, MAH indicates maleic anhydride. A unit of the amount of the materials in the table is parts by mass. Each of the "-" marked material components is not in use.

TABLE 1

| Classification | Raw material(s) | Ex 1 | 2 | 3 | 4 | 5 | 6 | 7 | 8 | 9 | 10 |
|---|---|---|---|---|---|---|---|---|---|---|---|
| Resin | Polypropylene | 100 | 100 | 100 | 100 | 100 | 100 | 100 | 100 | 100 | 100 |
| Graft-modified monomer | Glycidyl methacrylate | 5.0 | 1.0 | 10 | 5.0 | 5.0 | 5.0 | 5.0 | 5.0 | 5.0 | 0.5 |
| | Styrene | 3.8 | 0.75 | 7.5 | 3.8 | 3.8 | 3.8 | 3.8 | 3.8 | 3.8 | 3.8 |
| Organic peroxide | Dicumyl peroxide | 0.2 | 0.2 | 0.6 | 0.2 | 0.2 | 0.1 | 0.2 | 0.2 | 0.2 | 0.2 |
| Acid anhydride | MAH graft-modified polypropylene | 16.5 | 16.5 | 16.5 | 1.0 | 20.0 | 16.5 | 16.5 | 16.5 | — | 16.5 |
| | Pyromellitic dianhydride | — | — | — | — | — | — | — | — | 7.7 | — |
| Reinforced fiber | Glass fiber | 50.0 | 50.0 | 50.0 | 50.0 | 50.0 | 50.0 | 30.0 | 80.0 | 50.0 | 50.0 |
| | Carbon fiber | — | — | — | — | — | — | — | — | — | — |
| | Tensile strength MPa | 105 | 109 | 101 | 100 | 107 | 105 | 84 | 106 | 106 | 90 |
| | Peel strength N/mm | 2.6 | 2.1 | 3.1 | 1.7 | 2.5 | 1.6 | 3.2 | 1.7 | 2.7 | 1.6 |

Note:
'Ex' means Example according to this invention.

TABLE 2

| Classification | Raw material(s) | C Ex 1 | 2 | 3 | 4 |
|---|---|---|---|---|---|
| Resin | Polypropylene | 100 | 100 | 100 | 100 |
| Graft-modified monomer | Glycidyl methacrylate | — | 5.0 | 5.0 | 5.0 |
| | Styrene | — | 3.8 | 3.8 | 3.8 |
| Organic peroxide | Dicumyl peroxide | — | 0.2 | 0.2 | 0.2 |
| Acid anhydride | MAH graft-modified polypropylene | 16.5 | — | — | 16.5 |
| | Pyromellitic dianhydride | — | — | — | — |
| Reinforced fiber | Glass fiber | 50.0 | 50.0 | — | 25.0 |
| | Carbon fiber | — | — | 50.0 | — |
| | Tensile strength MPa | | 77 | 74 | 76 |
| | Peel strength N/mm | | 1.4 | 2.5 | 2.4 |

Note:
'C Ex' means Comparative Example.

It is apparent from the above-described Tables 1 and 2 that the tensile strength of each of the glass fiber-reinforced polyolefin resin materials used in Examples 1 to 10 was 80 MPa or more and also the peel strength thereof by the 180° peel test was 1.6 N/mm or more.

In contrast, with the glass fiber-reinforced polyolefin resin materials used in Comparative Example 1, in which polypropylene is not graft-modified with both glycidyl methacrylate containing an epoxy group, and styrene, although the tensile strength was 114 MPa which is strong, the peel strength was 0.4 N/mm which is weak.

Further, with the glass fiber-reinforced polyolefin resin materials used in Comparative Example 2, in which no acid anhydride was used, the peel strength, although stronger than Comparative Examples 1, was 1.4 N/mm which is not enough and also the tensile strength was 77 MPa which is weak. Even with Comparative Example 3 in which only glass fiber used in Comparative Example 2 was replaced with a carbon fiber, there was no improvement over the glass fiber-reinforced polyolefin resin materials used in Comparative Example 2, the tensile strength was substantially the same as Comparative Example 2.

Further, with Comparative Example 4 in which the blending amount of the glass fiber was less than 30 parts by mass with respect to 100 parts by mass of the graft-modified polypropylene, the tensile strength was 76 MPa which is weak.

It is seen from the above-described results that the tensile strength is increased while maintaining the peel strength by using polypropylene in combination with an acid anhydride, said polypropylene being graft-modified with at least a methacrylate containing an epoxy group, or further graft-modified with, in addition to this methacrylate, an aromatic vinyl compound.

Herein, from the comparison between Comparative Example 1 and, for example, Examples 1 and 2, it is seen that when the polypropylene is graft-modified with the above-described compounds, the tensile strength is somewhat weakened.

Further, with respect to the glass fiber-reinforced polyolefin resin materials of the present invention used in Examples 1 to 10, it is also apparently seen from their production methods described in these Examples that the glass fiber-reinforced polyolefin resin materials can be produced only by subjecting the compositions for the glass fiber-reinforced polyolefin resin materials to a graft reaction with heat kneading in the twin screw extruder, and they can be produced easily and inexpensively with high productivity.

Having described our invention as related to the present embodiments, it is our intention that the invention not be limited by any of the details of the description, unless otherwise specified, but rather be construed broadly within its spirit and scope as set out in the accompanying claims.

This application claims priority on Patent Application No. 2016-226339 filed in Japan on Nov. 21, 2016, which is entirely herein incorporated by reference.

The invention claimed is:

1. A glass fiber-reinforced polyolefin resin material, comprising: a glass fiber; and a thermoplastic resin,
wherein said thermoplastic resin comprises: at least, a graft-modified polypropylene modified with both a (meth)acrylate containing an epoxy group and an aromatic vinyl compound,
wherein, with respect to 100 parts by mass of the graft-modified polypropylene, from 30 to 80 parts by mass of the glass fiber and from 1 to 20 parts by mass of a compound or polymer having an acid anhydride structure are contained,
wherein, in the content of a graft-modification component in the graft-modified polypropylene, the content of a component obtained from the (meth)acrylate containing an epoxy group is 0.5 or more and 10 or less parts by mass with respect to 100 parts by mass of said polypropylene, and a component obtained from the aromatic vinyl compound has a mass equal to or less than said component obtained from the (meth)acrylate, and
wherein the aromatic vinyl compound is a styrene compound whose benzene ring may have a substituent.

2. The glass fiber-reinforced polyolefin resin material according to claim 1, wherein, with respect to a 2 mm-thick sheet formed by adhering the glass fiber-reinforced polyolefin resin material to an aluminum sheet, the peel strength by a 180° peel test after leaving, for 5 minutes at 220° C., the 2 mm-thick sheet in the condition of being placed in contact with a 0.1 mm-thick aluminum sheet having the same area, while applying a pressure thereto, is 1.6 N/mm or more.

3. The glass fiber-reinforced polyolefin resin material according to claim 1, wherein the tensile strength in conformity to JIS K 7161 of the sheet formed from the glass fiber-reinforced polyolefin resin material is 80 MPa or more.

4. The glass fiber-reinforced polyolefin resin material according to claim 1, wherein a reinforcement fiber to be contained is only the glass fiber.

5. The glass fiber-reinforced polyolefin resin material according to claim 1, wherein the diameter of the glass fiber is 20 μm or less and the length thereof is 1.2 mm or less.

6. The glass fiber-reinforced polyolefin resin material according to claim 1, wherein the (meth)acrylate containing an epoxy group is glycidyl acrylate or glycidyl methacrylate.

7. The glass fiber-reinforced polyolefin resin material according to claim 1, wherein the compound or polymer having an acid anhydride structure is an acid anhydride-modified polypropylene.

8. The glass fiber-reinforced polyolefin resin material according to claim 1, wherein the glass fiber-reinforced polyolefin resin material is a metal adhesive glass fiber-reinforced polyolefin resin material.

9. A composite, composed of: a metal; and the glass fiber-reinforced polyolefin resin material according to claim 1.

* * * * *